United States Patent
Iida et al.

(10) Patent No.: US 6,863,934 B2
(45) Date of Patent: Mar. 8, 2005

(54) METHOD OF SURFACE TREATMENT OF THERMOPLASTIC RESIN FILM

(75) Inventors: Seiichiro Iida, Ibaraki (JP); Hisashi Tani, Ibaraki (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 10/740,756

(22) Filed: Dec. 22, 2003

(65) Prior Publication Data

US 2004/0185285 A1 Sep. 23, 2004

Related U.S. Application Data

(63) Continuation of application No. PCT/JP02/06213, filed on Jun. 21, 2002.

(30) Foreign Application Priority Data

Jun. 21, 2001 (JP) ......................................... 2001-187745

(51) Int. Cl.$^7$ ............................. B05D 3/06; B05D 3/12
(52) U.S. Cl. ........................ 427/533; 427/536; 427/171; 427/393.5
(58) Field of Search ................................ 427/533, 536, 427/171, 393.5

(56) References Cited

U.S. PATENT DOCUMENTS 4,097,645 A * 6/1978 Toyoda et al. ........... 428/315.5
6,562,451 B2 * 5/2003 Syoda et al. ................ 428/330

FOREIGN PATENT DOCUMENTS

| EP | 1104702 | | 6/2001 |
|---|---|---|---|
| JP | 51-8377 | | 1/1976 |
| JP | 51-011840 | * | 1/1976 |
| JP | 60-229751 | * | 11/1985 |
| JP | 62-502692 | | 10/1987 |
| JP | 5-230247 | | 9/1993 |
| JP | 8-188662 | | 7/1996 |
| JP | 8-253728 | | 10/1996 |
| JP | 8-269310 | | 10/1996 |
| JP | 9-124975 | | 5/1997 |
| JP | 11-286559 | | 10/1999 |
| JP | 11-342534 | | 12/1999 |
| JP | 11-342565 | | 12/1999 |

* cited by examiner

Primary Examiner—Erma Cameron
(74) Attorney, Agent, or Firm—Oblon, Spivak, McClelland, Maier & Neustadt, P.C.

(57) ABSTRACT

Disclosed is a method of surface treatment of a thermoplastic resin film (i) which comprises the steps of subjecting the thermoplastic resin film (i) to surface oxidation, coating the oxidized film with a surface modifier (A) and then stretching the coated film, and which is characterized in that: the surface modifier (A) is an aqueous dispersion prepared by dispersing an olefin copolymer (a) with an unsaturated carboxylic acid or its anhydride bonded thereto in water along with at least one dispersant (b) selected from the group consisting of nonionic surfactants, nonionic water-soluble polymers, cationic surfactants and cationic water-soluble polymers; the ratio by weight of (a)/(b) in terms of the solid content thereof falls between 100/1 and 100/30; and the mean particle size of the resin in the surface modifier (A) is at most 5 μm. The method can provide a thermoplastic resin film of good melt thermal transfer printability and good offset printability capable of giving prints of good water resistance.

16 Claims, No Drawings

METHOD OF SURFACE TREATMENT OF THERMOPLASTIC RESIN FILM

This application is the continuation of PCT JP02/06213, filed Jun. 21, 2002, now WO 2003/000780.

BACKGROUND OF THE INVENTION

1. Field of the Invention

The present invention relates to a method for obtaining thermoplastic resin films of good offset printability and good melt thermal transfer printability capable of giving prints of good water resistance, which comprises the steps of subjecting the surface of the thermoplastic resin film to specific oxidation, then applying a specific surface modifier thereto to form a layer on it, and thereafter stretching the resultant in at least one direction.

2. Description of the Background

Coated paper is heretofore used for the base of outdoor propaganda stickers as well as that of adhesive labels to be stuck to frozen food containers, but its water resistance is unsatisfactory, and therefore it is reinforced with a polyester film applied on the surface thereof.

Recently, thermoplastic resin film of good water resistance, especially polyolefin-based synthetic paper has become much noticed as a hopeful material capable of being substituted for the polyester film-coated paper for the base of such labels. The resin film of the type is known, and its details are described in, for example, Japanese Examined Patent Publication (KOKOKU) No. 46-40794 and 49-1782, and Japanese Unexamined Patent Publication (KOKAI) No. 56-118437, 57-12642 and 57-56224.

However, since its material, polyolefin, is non-polar, the polyolefin-based synthetic paper is not always satisfactory in point of its printability in offset printing, gravure printing, relief printing, flexographic printing or the like and in point of its compatibility with melt thermal transfer printers, sublimation thermal transfer printers and others. Therefore, in general, it is subjected to suitable surface treatment before use.

One embodiment of such surface treatment known in the art is a method that comprises the steps of subjecting the surface of a non-stretched film for production of polyolefin synthetic paper to corona discharge treatment for oxidation, then applying a coating liquid to its surface, and then stretching the film, and optionally further subjecting the surface of the film to oxidation such as corona discharge treatment. For example, Japanese Unexamined Patent Publication (KOKAI) No. 7-266417 discloses a method for producing a laminate resin film that comprises the steps of subjecting a longitudinally-stretched film to corona treatment at 30 to 100 W·min/m$^2$, then coating the processed surface of the film with a coating liquid of ethylene-vinyl alcohol copolymer having an ethylene content of from 20 to 45 mol %, drying it, then stretching it in the lateral direction by the use of a tenter, and further subjecting it to corona treatment at 30 to 100 W·min/m$^2$. However, the laminate resin film produced according to the method is unsatisfactory in point of its melt thermal transfer printability and offset printability, and therefore, improving it in that point is desired.

Japanese Unexamined Patent Publication (KOKAI) No. 11-323267 discloses a film of good relief printability and good adhesiveness, which is fabricated by forming, on a polymer film, an adhesive layer that contains a copolymer of ethylene and an ethylenic unsaturated compound having an adhesiveness-imparting functional group wherein the ethylene content in the copolymer falls within a specific range. However, the adhesive film is also unsatisfactory in point of its offset printability and melt thermal transfer printability, and improving it is desired.

We, the present inventors, have proposed an image-receiving film for thermal transfer, which is fabricated by applying an aqueous resin dispersion to a thermoplastic resin film followed by drying it thereon and for which the resin dispersion is prepared by dispersing an olefin copolymer (a) with an unsaturated carboxylic acid or its anhydride bonded thereto in water along with at least one dispersant (b) selected from the group consisting of nonionic surfactants, nonionic water-soluble polymers, cationic surfactants and cationic water-soluble polymers, the ratio by weight of (a)/(b) in terms of the solid content thereof falls between 100/1 and 100/30 and the mean particle size of the dispersion is at most 5 μm (Japanese Patent Application No. 2000-365265).

Though its melt thermal transferability is good, the image-receiving film for thermal transfer is problematic in its offset printability, especially in point of the water resistance of the offset prints given by it, and there is still room for improvement in the film.

An object of the present invention is to provide a thermoplastic resin film of good melt thermal transfer printability and good offset printability capable of giving prints of good water resistance.

SUMMARY OF THE INVENTION

We, the present inventors have assiduously studied and, as a result, have found that, when a thermoplastic film is subjected to surface oxidation, coated with a specific surface modifier and stretched, it can have excellent properties. On the basis of this finding, we have reached the present invention.

Specifically, the invention provides a method of surface treatment of a thermoplastic resin film (i) which comprises the steps of subjecting the thermoplastic resin film (i) to surface oxidation, coating the oxidized film with a surface modifier (A) and then stretching the coated film, and which is characterized in that the surface modifier (A) is an aqueous dispersion prepared by dispersing an olefin copolymer (a) with an unsaturated carboxylic acid or its anhydride bonded thereto in water along with at least one dispersant (b) selected from the group consisting of nonionic surfactants, nonionic water-soluble polymers, cationic surfactants and cationic water-soluble polymers, the ratio by weight of (a)/(b) in terms of the solid content thereof falls between 100/1 and 100/30 and the mean particle size of the resin in the surface modifier (A) is at most 5 μm.

Preferably, the thermoplastic resin film (i) is a multi-layered resin film prepared by longitudinally stretching a substrate layer (ii) of thermoplastic resin followed by laminating a surface layer (iii) of thermoplastic resin on at least one face of the substrate layer (ii), and the film is laterally stretched; or the film (i) is a multi-layered resin film prepared by laminating a surface layer (iii) of thermoplastic resin on at least one face of a substrate layer (ii) of thermoplastic resin, and the film is longitudinally stretched. Also preferably, the multi-layered resin film comprises a substrate layer (ii) that contains from 40 to 100% by weight of a thermoplastic resin and from 0 to 60% by weight of an inorganic fine powder and/or an organic filler, and a surface layer (iii) that contains from 25 to 100% by weight of a thermoplastic resin and from 0 to 75% by weight of an inorganic fine powder and/or an organic filler. Also preferably, the porosity, as represented by the following formula, of the thermoplastic resin film (i) is from 10 to 60% after processed according to the surface treatment method of the invention.

$$\text{Porosity } (\%) = [(\rho_0 - \rho)/\rho_0] \times 100 \quad (1)$$

wherein $\rho_0$ indicates the density of the resin film before the stretching, and $\rho$ indicates the density of the resin film after the stretching.

Also preferably, the thermoplastic resin for the thermoplastic resin film (i) is a polyolefin-based resin, more preferably a propylene-based resin. Also preferably, the oxidation is at least one treatment selected from corona discharge treatment, flame treatment, plasma treatment, glow discharge treatment and ozone treatment. More preferably, the treatment is corona treatment effected at 10 to 200 W·min/m$^2$, or flame treatment effected at 8,000 to 200,000 J/m$^2$. Also preferably, the dispersant (b) is a cationic water-soluble polymer. Also preferably, the coating amount of the surface modifier (A) is at least 0.005 g/m$^2$ in terms of the dry weight thereof.

BEST MODE FOR CARRYING OUT THE INVENTION

The method of the invention is described in detail hereinunder, which comprises the steps of subjecting a thermoplastic resin film (i) to surface oxidation, then coating the oxidized film with a surface modifier (A) and stretching the coated film. In this description, the numerical range expressed by the wording "a number to another number" means the range that falls between the former number indicating the lowermost limit of the range and the latter number indicating the uppermost limit thereof.

[Thermoplastic Resin Film (i)]

The thermoplastic resin for the thermoplastic resin film (i) to which the method of the invention is applied includes polyolefin-based resins, for example, ethylene-based resin such as high-density polyethylene, middle-density polyethylene, or propylene-based resin, polymethyl-1-pentene, ethylene-cyclic olefin copolymer; polyamide-based resins such as nylon-6, nylon-6,6, nylon-6,10, nylon-6,12; thermoplastic polyester-based resins such as polyethylene terephthalate and its copolymer, polyethylene naphthalate, aliphatic polyester; and other thermoplastic resins such as polycarbonate, atactic polystyrene, syndiotactic polystyrene, polyphenylene sulfide. Two or more of these may be used herein, as combined.

Of those thermoplastic resins, more preferred are non-polar polyolefin-based resins, which achieve the advantageous effects of the invention with a higher degree. Of such polyolefin-based resins, even more preferred is propylene-based resin in view of its chemical resistance and cost. The propylene-based resin includes propylene homopolymer, isotactic or syndiotactic polypropylene or polypropylene of any other various stereospecificity; and propylene-based copolymer with α-olefin comonomer of ethylene, butene-1, hexene-1, heptene-1, 4-methylpentene-1 or the like. The copolymer may be in any form of bi-copolymer, ter-copolymer or tetra-copolymer, and may be either random copolymer or block copolymer.

In case where a propylene homopolymer is used, it is desirable that from 2 to 25% by weight of a resin having a melting point lower than that of propylene homopolymer, such as polyethylene or ethylene/vinyl acetate copolymer is added to it in order to improve stretching property.

The thermoplastic resin film (i) may have a single-layered structure of itself, or a two-layered structure of a substrate layer (ii) and a surface layer (iii), or a three-layered structure of a substrate layer (ii) with a surface layer (iii) on both surface thereof, or a multi-layered structure of a substrate layer (ii) and a surface layer (iii) with any other resin film layer between the two. The film (i) may or may not contain an inorganic fine powder and/or an organic filler.

In case where the thermoplastic resin film (i) is a polyolefin-based resin film having a single-layered structure and when it contains an inorganic fine powder and/or an organic filler, then it generally contains from 40 to 99.5% by weight of a polyolefin-based resin and from 0.5 to 60% by weight of an inorganic fine powder and/or an organic filler, but preferably from 50 to 97% by weight of a polyolefin-based resin and from 3 to 50% by weight of an inorganic fine powder and/or an organic filler. In case where the thermoplastic resin film (i) has a multi-layered structure and when the substrate layer (ii) and the surface layer (iii) contain an inorganic fine powder and/or an organic filler, then, in general, the substrate layer (ii) contains from 40 to 100% by weight of a polyolefin-based resin and from 0 to 60% by weight of an inorganic fine powder and/or an organic filler and the surface layer (iii) contains from 25 to 100% by weight of a polyolefin-based resin and from 0 to 75% by weight of an inorganic fine powder and/or an organic filler, but preferably the substrate layer (ii) contains from 50 to 97% by weight of a polyolefin-based resin and from 3 to 50% by weight of an inorganic fine powder and/or an organic filler and the surface layer (iii) contains from 30 to 97% by weight of a polyolefin-based resin and from 3 to 70% by weight of an inorganic fine powder and/or an organic filler.

If the content of the inorganic fine powder and/or the organic filler in the single-layered film or in the multi-layered substrate layer (ii) is larger than 60% by weight, then the longitudinally-stretched film may tend to be readily broken when it is laterally stretched. If the content of the inorganic fine powder and/or the organic filler in the surface layer (iii) is larger than 75% by weight, then the surface strength of the surface layer of the laterally-stretched film will lower and the film may tend to be thereby readily delaminated.

The inorganic fine powder includes calcium carbonate, calcined clay, silica, diatomaceous earth, talc, titanium oxide, barium sulfate and alumina, and its mean particle size is preferably from 0.01 to 15 µm, more preferably from 0.2 to 7 µm. If the mean particle size of the powder is smaller than 0.01 µm, then it may cause troubles of classification and aggregation when the powder is mixed with thermoplastic resin. If the mean particle size of the powder is larger than 15 µm, then it may cause troubles of generation of color spots.

In case where the thermoplastic resin film is a polyolefin-based resin film, then the organic filler for it may be any of polyethylene terephthalate, polybutylene terephthalate, polycarbonate, nylon-6, nylon-6,6, cyclic olefin polymer, cyclic olefin-ethylene copolymer and the like having a melting point (e.g., 120 to 300° C.) or a glass transition point (e.g., 120 to 280° C.) higher than the melting point of polyolefin based resin.

If desired, a stabilizer, a light stabilizer, a dispersant and a lubricant may be added to the resin film. Concretely, the resin film may contain from 0.001 to 1% by weight of a stabilizer of, for example, steric-hindered phenols, phosphorus-containing compounds or amines, from 0.001 to 1% by weight of a light stabilizer of, for example, steric-hindered amines, benzotriazoles or benzophenones, and from 0.01 to 4% by weight of a dispersant for inorganic fine powder of, for example, silane coupling agents, higher fatty acids such as oleic acid and stearic acid, metal soap, polyacrylic acids, polymethacrylic acids and their salts.

[Formation of Resin Film]

Not specifically defined, various known methods may be employed for forming the thermoplastic resin film. Concretely, herein employable are casting, calendering, rolling or inflation that comprises sheet-wise extruding a resin melt through a single-layered or multi-layered T-die or I-die connected to a screw extruder; removal of solvent or oil after casting or calendering of a mixture of thermoplastic resin and organic solvent or oil; and film formation from a solution of thermoplastic resin followed by solvent removal from the films formed.

In case where the films are stretched, various known methods may be employed for it. Concretely, herein employable are longitudinal stretching to be attained by the peripheral speed difference between rolls, and lateral stretching to be attained in a tenter oven.

[Resin Film]

For the thermoplastic resin film (i) to which the method of the invention is applied, used is thermoplastic resin, and the film may be or may not be stretched. However, the film must be stretchable after its surface treatment. The film may or may not contain an inorganic fine powder and/or an organic filler. The film may have a non-stretched resin layer formed on at least one face of the stretched base layer thereof.

In case where the thermoplastic resin film (i) is a polyolefin-based resin film and when it has a single-layered structure and contains an inorganic fine powder and/or an organic filler, then it may be fabricated by monoaxially or biaxially stretching a resin film of a resin composition that contains, for example, from 40 to 99.5% by weight of a polyolefin-based resin and from 0.5 to 60% by weight of an inorganic fine powder and/or an organic filler, at a temperature lower than the melting point of the constituent component, polyolefin-based resin, preferably at a temperature lower than that temperature by 3 to 60° C. to give a porous, stretched resin film that has fine cracks in its surface and has fine voids inside it.

In case where the thermoplastic resin film (i) has a multi-layered structure, it may be fabricated as follows: A resin film of a resin composition that contains, for example, from 40 to 100% by weight of a polyolefin-based resin and from 0 to 60% by weight of an inorganic fine powder and/or an organic filler is longitudinally stretched at a temperature lower than the melting point of the polyolefin-based resin, preferably at a temperature lower than that temperature by 3 to 60° C. to form a substrate layer (ii), and a surface layer (iii) of a resin film of a resin composition that contains from 25 to 100% by weight of a polyolefin-based resin and from 0 to 75% by weight of an inorganic fine powder and/or an organic filler is laminated on at least one face of the substrate layer (ii). Thus constructed, the film is subjected to surface treatment in the invention.

Of the films mentioned above, more preferred are those fabricated by monoaxially stretching a polyolefin-based resin film that contains from 5 to 60% by weight of inorganic fine powder of calcined clay, heavy or light calcium carbonate, titanium oxide, talc or the like to give a semi-transparent or opaque film that contains innumerable voids formed around the particles of the inorganic fine powder, and their modificates further having a resin composition layer that contains the fine powder and is laminated on those films; and laminates which have, as the surface layer thereof, a polyolefin resin film layer not substantially containing an inorganic fine powder and which are non-stretched sheets or longitudinally-stretched sheets for successive biaxial stretching for fabrication of synthetic paper, as in Japanese Examined Patent Publication (KOKOKU) No. 1-60411 and Japanese Unexamined Patent Publication (KOKAI) No. 61-3748.

The thickness of the resin film that is subjected to the surface treatment in the former stage of the invention may be suitably determined depending on the draw ratio thereof and on the necessary thickness of the stretched film. In general, it may be from 20 to 4000 $\mu$m, preferably from 100 to 3000 $\mu$m.

[Surface Oxidation]

For the surface oxidation of the film mentioned above preferred is at least one selected from corona discharge treatment, flame treatment, plasma treatment, glow discharge treatment and ozone treatment. More preferred are corona treatment and flame treatment. The treatment dose in corona treatment may be from 600 to 12,000 $J/m^2$ (10 to 200 $W \cdot min/m^2$), preferably from 1,200 to 9,000 $J/m^2$ (20 to 150 $W \cdot min/m^2$). If it is lower than 600 $J/m^2$ (10 $W \cdot min/m^2$), then the corona discharge treatment may tend to be ineffective and the surface of the film will repel the surface modifier applied thereto in the subsequent step; but even if higher than 12,000 $J/m^2$ (200 $W \cdot min/m^2$), the effect of the treatment may not be augmented anymore. Therefore, the treatment will be enough at 12,000 $J/m^2$ or lower. The treatment dose in flame treatment may be from 8,000 to 200,000 $J/m^2$, preferably from 20,000 to 100,000 $J/m^2$. If it is lower than 8,000 $J/m^2$, then the flame treatment may be ineffective and the surface of the film may tend to repel the surface modifier applied thereto in the subsequent step; but even if higher than 200,000 $J/m^2$, the effect of the treatment may not be augmented any more. Therefore, the treatment will be enough at 200,000 $J/m^2$ or lower.

[Surface Modifier (A)]

The surface modifier (A) for use in the invention is characterized in that it is an aqueous dispersion prepared by dispersing an olefin copolymer (a) with an unsaturated carboxylic acid or its anhydride bonded thereto in water along with at least one dispersant (b) selected from the group consisting of nonionic surfactants, nonionic water-soluble polymers, cationic surfactants and cationic water-soluble polymers, the ratio by weight of (a)/(b) in terms of the solid content thereof falls between 100/1 and 100/30, and the mean particle size of the resin (a) in the surface modifier (A) is at most 5 $\mu$m.

Though not sticking to any theory, it is believed that the olefin copolymer (a) with an unsaturated carboxylic acid or its anhydride bonded thereto may give adhesiveness to the substrate and melt thermal transferability. In addition, it is further believed that the dispersant (b) of at least one selected from the group that consists of nonionic surfactants, nonionic water-soluble polymers, cationic surfactants and cationic water-soluble polymers may improve the offset printability of the film.

The olefin copolymer (a) with an unsaturated carboxylic acid or its anhydride bonded thereto, which constitutes the surface modifier (A), includes ethylene-(meth)acrylic acid copolymer, alkaline (earth) metal salt of ethylene-(meth)acrylic acid copolymer, ethylene-(meth)acrylate-maleic anhydride copolymer, (meth)acrylic acid-grafted polyethylene, maleic anhydride-grafted polyethylene, maleic anhydride-grafted ethylene-vinyl acetate copolymer, maleic anhydride-grafted (meth)acrylate-ethylene copolymer, maleic anhydride-grafted polypropylene, maleic anhydride-grafted ethylene-propylene copolymer, maleic anhydride-grafted ethylene-propylene-butene copolymer, maleic anhydride-grafted ethylene-butene copolymer, and maleic anhydride-grafted propylene-butene copolymer.

Of those, especially preferred are ethylene-(meth)acrylic acid copolymer, ethylene-(meth)acrylate-maleic anhydride copolymer, maleic anhydride-grafted ethylene-vinyl acetate copolymer, maleic anhydride-grafted (meth)acrylate-ethylene copolymer, maleic anhydride-grafted ethylene-propylene-butene copolymer, maleic anhydride-grafted ethylene-butene copolymer and maleic anhydride-grafted propylene-butene copolymer of which the melting point or the softening point is not higher than 130° C., in view of their ability to receive ink.

In the olefin copolymer (a) with an unsaturated carboxylic acid or its anhydride bonded thereto, the content of the unsaturated carboxylic acid or its anhydride is preferably from 2 to 40% by weight, more preferably from 3 to 20% by weight, even more preferably from 4 to 15% by weight.

It is undesirable that the olefin copolymer with an unsaturated carboxylic acid or its anhydride bonded thereto is formed into an ammonium salt or an alkylamine salt thereof at its carboxylic acid to thereby increase the dispersibility of the resulting salt in water, since the aqueous dispersion of the type (this is hereinafter referred to as a "self-emulsifiable aqueous dispersion") is not effective for improving the offset printability of the film processed with it.

In the invention, the dispersant (b) that acts to disperse the olefin copolymer with an unsaturated carboxylic acid or its anhydride bonded thereto in water must be at least one selected from the group consisting of nonionic surfactants, nonionic water-soluble polymers, cationic surfactants and cationic water-soluble polymers. Anionic surfactant such as sodium polysulfonate that is generally used as a dispersant is unfavorable in the invention since it may worsen the offset printability of films.

Examples of the nonionic surfactant are polyoxyethylene alkyl ether, polyoxyethylene alkylallyl ether, polyoxyethylene-oxypropylene block polymer, polyethylene glycol fatty acid ester, and polyoxyethylene sorbitan fatty acid ester.

Examples of the nonionic water-soluble polymer are completely-saponified polyvinyl alcohol, partially-saponified polyvinyl alcohol and their modificates, and hydroxyethyl cellulose.

Examples of the cationic surfactant are stearylamine hydrochloride, lauryltrimethylammonium chloride, and trimethyloctadecylammonium chloride.

Examples of the cationic water-soluble polymer are polymer having quaternary ammonium structure or phosphonium salt structure, nitrogen-containing (meth)acrylic polymer, and (meth)acrylic polymer containing a nitrogen atom constituting a quaternary ammonium salt.

Of those, especially preferred are cationic water-soluble polymers such as nitrogen-containing (meth)acrylic polymer and (meth)acrylic polymer containing a nitrogen atom constituting a quaternary ammonium salt, in view of the adhesiveness to thermoplastic resin film and the offset printability thereof.

For dispersing the olefin copolymer (a) with an unsaturated carboxylic acid or its anhydride bonded thereto in water by the action of the dispersant (b), the ratio by weight of (a)/(b) in terms of the solid content thereof must fall between 100/1 and 100/30, but preferably between 100/2 and 100/20, more preferably between 100/5 and 100/15. If the amount of the dispersant is smaller than the range, then the olefin copolymer with an unsaturated carboxylic acid or its anhydride bonded thereto could not be dispersed in water. On the contrary, if the amount of the dispersant is larger than the range, it will have a negative influence on the improvement of ink adhesion to films in melt thermal transfer printing at high temperature and high humidity.

The mean particle size of the resin particles in the component (A) must be at most 5 $\mu$m, but preferably at most 3 $\mu$m, more preferably at most 1 $\mu$m. If the particles are larger than 5 $\mu$m, then not only the stability of the aqueous dispersion will be poor but also the adhesiveness thereof to the support of thermoplastic resin films will be also poor.

For dispersing the olefin copolymer (a) with an unsaturated carboxylic acid or its anhydride bonded thereto in water along with the dispersant (b), for example, employable is a method that comprises dissolving the olefin-based copolymer in an aromatic hydrocarbon solvent under heat, then mixing the dispersant (b) with it under stirring, subsequently subjecting it to phase conversion with adding water thereto, and thereafter removing the aromatic hydrocarbon solvent through distillation to thereby obtain the intended aqueous dispersion; or a method that comprises feeding the olefin-based copolymer into the hopper of a double-screw extruder, then adding an aqueous solution of the dispersant (b) to the copolymer melt under heat and melt-kneading it, and subsequently adding water thereto to obtain the intended dispersion, as in Japanese Examined Patent Publication (KOKOKU) No. 62-29447. Of those, preferred is the method of using a double-screw extruder when the dispersant (b) is a cationic water-soluble polymer such as a nitrogen-containing (meth)acrylic polymer or a (meth)acrylic polymer containing a nitrogen atom constituting a quaternary ammonium salt, in view of the mean particle size of the resin particles in the aqueous dispersion obtained.

If desired, the surface modifier for use in the invention may contain any auxiliary additives such as defoaming agent, wetting agent, antiblocking agent and the like, not interfering with the melt thermal transfer printability and the offset printability of the surface-processed films.

[Formation of Surface-Modifying Layer]

The constituent components of the surface modifier may be used either directly as they are or after diluted or dissolved in a hydrophilic solvent such as water, methyl alcohol, ethyl alcohol or isopropyl alcohol. Especially preferably, they are used as aqueous solutions thereof. The solution concentration is generally from 0.05 to 60% by weight, preferably from 0.1 to 40% by weight or so. If the concentration is lower than 0.05% by weight, the step of drying the coating layer may have to be specifically planned, for example, by prolonging the drying time; but if higher than 60% by weight, the coating layer maybe uneven.

Coating the films with the surface modifier may be effected by the use of a roll coater, a blade coater, a bar coater, an air knife coater, a size press coater, a gravure coater, a reverse coater, a die coater, a lip coater, a spray coater or the like. If desired, the coated films may be smoothed or dried to thereby remove any excess water or hydrophilic solvent.

The coating amount of the surface modifier is preferably from 0.005 to 10 g/m$^2$, more preferably from 0.01 to 1 g/m$^2$, even more preferably from 0.01 to 0.6 g/m$^2$ in terms of the dry solid content thereof. If it is smaller than 0.005 g/m$^2$, then the surface modifier may be ineffective; but if larger than 10 g/m$^2$, it may be saturated.

[Stretching]

In the invention, a thermoplastic resin film is subjected to surface oxidation, then coated with the surface modifier, and thereafter stretched while the surface modifier thereon is dried at the same time. Though not sticking to any theory, it is believed that, when the surface modifier on the film is dried at the same time while the film is stretched, then the surface modifier may firmly stick to the substrate of the film and, as a result, the water resistance of the prints given by the surface-processed film may be thereby increased.

For stretching the film, employable is any known method. The film may be stretched at any temperature suitable to the thermoplastic resin that forms it. Concretely, when the thermoplastic resin to form the film is amorphous resin, then the resin film may be stretched at a temperature not lower than the glass transition point of the resin; but when it is crystalline resin, then the resin film may be stretched at a temperature falling between the glass transition point of the amorphous part thereof and the melting point of the crystalline part thereof. The stretching mode may be any of longitudinal stretching to be attained by the peripheral speed difference between rolls, lateral stretching to be attained in a tenter oven, rolling, or simultaneous biaxial stretching to be attained by the combination of a tenter oven and a linear motor.

The stretching temperature is lower by from 2 to 60° C. than the melting point of the thermoplastic resin that forms the film to be stretched. When the resin is propylene homopolymer (melting point, 155 to 167° C.), then the resin film may be stretched at a temperature falling between 110 and 164° C.; when the resin is high-density polyethylene (melting point, 121 to 134° C.), then it may be stretched at a temperature falling between 110 and 120° C.; and when the resin is polyethylene terephthalate (melting point, 246 to 252° C.), then it may be stretched at a temperature falling between 104 and 115° C. Anyhow, the stretching temperature shall be suitably selected depending on the stretching process and condition employed.

Not specifically defined, the draw ratio for the stretching may be suitably selected depending on the object of the invention and the properties of the thermoplastic resin used. For example, when the thermoplastic resin for the film is propylene homopolymer or copolymer and when the film is stretched in one direction, then the draw ratio thereof may be from about 1.2 to 12 times, preferably from 2 to 10 times, but when the film is stretched biaxially, then the draw ratio may be from 1.5 to 60 times, preferably from 10 to 50 times in terms of the areal ratio. When any other thermoplastic resin film is stretched in one direction, then the draw ratio thereof may be from 1.2 to 10 times, preferably from 2 to 5 times; and when it is stretched biaxially, then the draw ratio may be from 1.5 to 20 times, preferably from 4 to 12 times in terms of the areal ratio. Further if desired, the stretched film may be annealed at a high temperature. The pulling rate for the stretching is preferably from 20 to 350 m/min.

In case where the thermoplastic resin film contains an inorganic fine powder and/or an organic filler, then fine cracks may be formed in the film surface and fine voids may be inside the film.

After stretched, the thickness of the thermoplastic resin film (i) is preferably from 20 to 500 μm, more preferably from 35 to 300 μm.

For preventing it from being statistically electrified, the stretched film may be again subjected to the same surface oxidation as above.

After stretched, the thermoplastic resin film has good properties, for example, having a porosity of its substrate, as represented by the above-mentioned formula, of from 10 to 60%, a density of from 0.650 to 1.20 g/cm³, an opacity of at least 75%, and a Beck smoothness of from 50 to 25,000 seconds.

The following Production Examples 1 to 4 are to demonstrate the production of thermoplastic resin sheets and surface modifiers; Examples 1 to 9 and Comparative Examples 1 to 6 are to demonstrate various methods of surface treatment of the sheets with the surface modifiers; and Test Examples 1 and 2 are to evaluate the surface-treated sheets. The details of the sheet materials used in the Examples are given in Table 1.

The material, the amount, the blend ratio, the treatment and the process employed in the following Examples may be varied in any desired manner not overstepping the idea and the scope of the invention. Accordingly, the following Examples are not whatsoever intended to restrict the scope of the invention.

TABLE 1

| Code | Details |
| --- | --- |
| PP1 | Propylene Homopolymer [Novatec PP:EA8 manufactured by Japan Polychem (K.K.)] (MFR (230° C., 2.16 kg load) = 0.8 g/10 min), melting point (167° C., DSC peak temperature) |
| PP2 | Propylene Homopolymer [Novatec PP:MA4 manufactured by Japan Polychem (K.K.)] (MFR (230° C., 2.16 kg load) = 5 g/10 min), melting point (167° C., DSC peak temperature) |
| PP3 | Ethylene-Propylene Random Copolymer [Novatec PP:X1804 manufactured by Japan Polychem (K.K.)], (MFR (230° C., 2.16 kg load) = 5 g/10 min), melting point (145° C., DSC peak temperature) |
| Inorganic Fine Powder (a) | Heavy Calcium Carbonate [Softon 1800 manufactured by Bihoku Hunka Kogyo (K.K.)], having a mean particle size of 1.8 μm |

PRODUCTION EXAMPLE 1

Production of Thermoplastic Resin Sheet (P1)

A composition (c') prepared by blending 85% by weight of PP1 and 15% by weight of inorganic fine powder (a) was kneaded in an extruder set at 240° C., and extruded out of it into a sheet, which was then cooled in a cooling device to obtain an on-stretched sheet. The above sheet-like extruded composition, and the compositions mentioned below for extrusion and lamination contained 0.05 parts by weight, relative to 100 parts by weight of the sum of the propylene based resin and the inorganic fine powder used, of 3-methyl-2,6-di-t-butylphenol, 0.05 parts by weight of a phenolic stabilizer (Ciba-Geigy's Irganox 1010®), and 0.05 parts by weight of a phosphorus-containing stabilizer (Borg-Warner's Weston 618®). The sheet was heated at 140° C. and stretched 5 times in the machine direction. A melt of a composition (a') prepared by mixing 50% by weight of PP2 and 50% by weight of inorganic fine powder (a) followed by melt-kneading it in an extruder set at 250° C., and a melt of a composition (b') prepared by mixing 55% by weight of PP2 and 45% by weight of inorganic fine powder (a) followed by melt-kneading it in a different extruder set at 250° C. were laminated in a die, and the resulting laminate was co-extruded out onto both faces of the 5-times stretched sheet that had been prepared in the above, in such a manner that with the layer (a') of the laminate could face outside. The process gave a 5-layered laminate (a'/b'/c'/b'/a'), thermoplastic resin sheet (P1).

PRODUCTION EXAMPLE 2

Production of Thermoplastic Resin Sheet (P2)

In the same manner as in Production Example 1, a 5-layered laminate, thermoplastic resin sheet (P2) was produced, for which, however, PP3 was used in the composition for (a') in place of PP2.

PRODUCTION EXAMPLE 3

Production of Surface Modifier (A1)

62.9 parts by weight of N,N-dimethylaminoethyl methacrylate, 71 parts by weight of butyl methacrylate, 25.4 parts by weight of lauryl methacrylate and 200 parts by weight of isopropyl alcohol were fed into a four-neck flask equipped with a stirrer, a reflux condenser, a thermometer and a dropping funnel, and purged with nitrogen gas, and then 0.9 parts by weight of a polymerization initiator, 2,2'-azobisisobutyronitrile was added thereto with which the monomers were polymerized at 80° C. for 4 hours. Next, this was neutralized with 24 parts by weight of acetic acid, and water was added thereto with removing isopropyl alcohol through distillation. Finally, this gave a viscous aqueous solution of a dispersant having a solid content of 35%.

Ethylene/methacrylic acid copolymer (methacrylic acid content 10%, MFR 35/10 min) was continuously fed into a unidirectionally-working double-screw extruder (Ikegail's PCM®-45φ) at a flow rate of 100 parts by weight/hr. The aqueous dispersant solution prepared in the above was continuously fed into the extruder though the first inlet mouth thereof at a rate of 22.9 parts by weight/hr (corresponding to 8 parts by weight/hr as the solid content of the dispersant) and water was also continuously thereinto through the second inlet thereof at a rate of 70 parts by weight/hr, while the resulting mixture was continuously extruded out of the extruder at a heating temperature (cylinder temperature) of 130° C. to obtain a milky white, aqueous resin dispersion. The aqueous resin dispersion was filtered through a 250-mesh stainless metal gauze. Then, water was added thereto to make it have a solid content of 45%. Thus obtained, this is surface modifier (A1) that contains a cationic water-soluble (meth)acrylic resin.

Measured with a laser-type particle distribution analyzer (Shimadzu's SALD-2000), the mean particle size of the aqueous resin dispersion was 0.74 μm.

PRODUCTION EXAMPLE 4

Preparation of Surface Modifier (B1)

A self-emulsifiable aqueous solution of ethylene/ammonium acrylate copolymer, Zaikthene A (Sumitomo Seika's product with no dispersant) was prepared, and this is surface modifier (B1).

EXAMPLE 1

(1) Oxidation

The surface of the thermoplastic resin sheet (P1) was subjected to corona discharge treatment with a corona surface treater (Kasuga Electric's HFS400F). Concretely, a silicone-coated roll was used for the treater roll, and the gap between the aluminium electrode and the roll was 2 mm. The line speed was about 30 m/min, and the applied energy density was 100 W·min/m$^2$.

(2) Application of Surface Modifier

The surface modifier (A1) was applied to the corona-discharged surface of the sheet to such a degree that the dry weight thereof could be about 0.15 g/m$^2$. Thus coated, the sheet was then led into a tenter oven mentioned below.

(3) Stretching

The thermoplastic resin sheet that had been subjected to oxidation and coated with the surface modifier was heated in an tenter oven at 155° C., and then stretched 8.5 times in the lateral direction to give a 5-layered laminate film having a thickness of 110 μm (thickness of each layer, 6 μm/23 μm/52 μm/23 μm/6 μm).

Comparative Example 1

A film was fabricated in the same manner as in Example 1, which, however, was not coated with the surface modifier.

Comparative Example 2

A film was fabricated in the same manner as in Example 1, which, however, was not subjected to corona discharge treatment but was coated with the surface modifier (A1) before stretching. While the surface modifier (A1) was applied to the film, it was repelled. The film could not be uniformly coated, and it was not evaluated.

Comparative Example 3

A film was fabricated in the same manner as in Example 1, for which, however, surface modifier (B1) was used but not the surface modifier (A1).

EXAMPLES 2 AND 3

Films were fabricated in the same manner as in Example 1, for which, however, the coating amount of the surface modifier was varied as in Table 2.

EXAMPLES 4 AND 5

Films were fabricated in the same manner as in Example 1, for which, however, the degree of corona discharge treatment before stretching was varied as in Table 2.

Comparative Example 4

A film was fabricated in the same manner as in Example 1, for which, however, the degree of corona discharge treatment before stretching was 5 W·min/m$^2$. While the surface modifier (A1) was applied to the film, it was repelled. The film could not be uniformly coated, and it was not evaluated.

EXAMPLE 6

A film was fabricated in the same manner as in Example 1, which, however, was subjected to flame treatment before stretching. Concretely, both faces of the non-stretched, 5-layered laminate (P1) were processed with a direct flame plasma processor (Flynn Burner's Flynn F3000), for which the combustion gas was propane. The line speed was 40 m/min, and the applied energy was 37,700 J/m$^2$.

EXAMPLE 7

A film was fabricated in the same manner as in Example 6, for which, however, the applied energy for flame treatment before stretching was 28,000 μm$^2$.

EXAMPLE 8

A film was fabricated in the same manner as in Example 6, for which, however, the applied energy for flame treatment before stretching was 60,600 J/m$^2$ and the line speed was 70 m/min.

EXAMPLE 9

A film was fabricated in the same manner as in Example 1, for which, however, used was the thermoplastic resin sheet (P2).

Comparative Example 5

The thermoplastic resin sheet (P1) was stretched in the same manner as in Example 1, which, however was not subjected to oxidation and was not coated with the surface modifier. Thus stretched, the sheet was then subjected to oxidation and coated with the surface modifier (A1) in the same manner as in Example 1. Next, this was dried at 60° C. to give a 5-layered laminate film having a thickness of 110 µm (thickness of each layer, 6 µm/23 µm/52 µm/23 µm/6 µm)

Comparative Example 6

A film was fabricated in the same manner as in Comparative Example 5, for which, however, the drying temperature after coated with the surface modifier (A1) was 155° C. Most of the dried film was shrunk, and evaluating it was stopped.

Test Example 1

The melt thermal transfer printability of the films produced in Examples 1 to 9 and Comparative Examples 1, 3 and 5 was evaluated in the manner mentioned below. For printing them, used was a bar code printer (Tec's B-30-S5®) and a meltable resin ink ribbon (Ricoh's B110C®).

[Evaluation of Ink Transferability]

Using the printer with the ribbon as above, bar code letters were printed on one face of the film at 35° C. and a relative humidity of 85%, whereupon the ink transferability on the film was evaluated according to the following five ranks:

5: good (sharp image formed).
4: acceptable (some bar code letters blurred in some degree, but the printed image is on practicable level).
3: unacceptable (bar code letters cut).
2: unacceptable (bar code letters illegible).
1: unacceptable (little ink transferred).

[Evaluation of Ink Adhesiveness]

Using the printer with the ribbon as above, bar code letters were printed on one face of the film at 23° C. and a relative humidity of 50%. The prints were conditioned at 35° C. and a relative humidity of 85% for 2 hours or more. An adhesive cellophane tape (Nichiban's Cellotape®) was applied to each of them, well stuck thereto, and then slowly released from it, whereupon the ink adhesiveness to the prints was evaluated according to the following five ranks:

5: good (no ink peeled at all).
4: acceptable (ink peeled only slightly, but the printed image is still on practicable level).
3: unacceptable (less than 25% peeled).
2: unacceptable (from 25% to 75% peeled).
1: unacceptable (more than 75% peeled).

Test Example 2

Test for Offset Printability

The films produced in Examples 1 to 9 and Comparative Examples 1, 3 and 5 were tested for the offset printability thereof in the manner mentioned below. As the printer, used was a printability tester, Akari Seisakusho's Model RI-III® with printing ink, T & K Toka's Best Cure 161® (black).

[Ink Transferability]

The films were stored at 23° C. and a relative humidity of 50% for 3 days. Using the printer as above, ink was applied to the coated face of each film to a thickness of 1.5 g/m². Using a reflection densitometer (Macbeth Densitometer® by Colmogen (USA)), the Macbeth density of the printed surface was measured.

[Ink Adhesiveness]

The films were stored at 23° C. and a relative humidity of 50% for 3 days. Using the printer as above, ink was applied to the coated face of each film to a thickness of 1.5 g/m². Thus printed, each film was exposed to one I-Graphic's metal halide lamp (80 W/cm) by passing it once through the lamp at a distance of 10 cm from the lamp, at a traveling speed of 10 m/min. Then, using an adhesiveness tester (Kumagaya Riki Kogyo's Internal Bond Tester®), the ink adhesiveness to the film was measured.

The principle of the adhesiveness determination is as follows: An aluminium angle was stuck to the top face of the sample with an adhesive cellophane tape (Nichiban's Cellotape®) adhered to the printed face thereof, and the back face of the sample was processed in the same manner. Thus processed, the back face of the sample was fixed to a predetermined holder, and a hammer was swung down to it at an angle of 90 degrees so as to give an impact to the aluminium angle, and the peeling energy was measured. The samples having an adhesiveness strength of at least 1.2 kg.cm are good.

[Water Resistance]

The films were stored at 23° C. and a relative humidity of 50% for 3 days. Using the printer as above, ink was applied to the coated face of each film to a thickness of 1.5 g/m². Thus printed, each film was exposed to one I-Graphic's metal halide lamp (80 W/cm) by passing it once through the lamp at a distance is of 10 cm from the lamp, at a traveling speed of 10 m/min. Thus exposed, the prints were dipped in water at 23° C. for 3 hours. Still in water, each print was folded with the printed face inside, and the thus-folded printed faces were rubbed 30 times/30 seconds to thereby evaluate the rubbing resistance of the printed faces in water. The evaluation criteria are as follows:

5: good (no ink peeled at all).
4: acceptable (ink peeled only slightly, but the printed image is still on practicable level).
3: unacceptable (less than 25% peeled).
2: unacceptable (from 25% to 75% peeled).
1: unacceptable (more than 75% peeled).

The processing condition in fabricating the films and the test result are given in Table 2 and Table 3. In addition, the film porosity is also given in the Tables.

TABLE 2

| Item | | Example 1 | Comparative Example 1 | Comparative Example 2 | Comparative Example 3 | Example 2 | Example 3 | Example 4 | Example 5 | Comparative Example 4 |
|---|---|---|---|---|---|---|---|---|---|---|
| | Abbreviation of Thermoplastic Resin Sheet | P1 | P1 | P1 | P1 | P1 | P1 | P1 | P1 | P1 |
| Surface Treatment | Type of Surface Treatment | corona discharge | corona discharge | — | corona discharge | corona discharge | corona discharge | corona discharge | corona discharge | corona discharge |
| | Degree of Treatment (corona treatment, W min/m², flame treatment, J/m²) | 100 | 100 | — | 100 | 100 | 100 | 40 | 180 | 5 |
| | Abbreviation of Surface Modifier | A1 | — | A1 | B1 | A1 | A1 | A1 | A1 | A1 |
| | Timing at Coating | before stretching | — | before stretching | before stretching | before stretching | before stretching | before stretching | before stretching | before stretching |
| | Drying Temperature (° C.) | 155 | 155 | 155 | 155 | 155 | 155 | 155 | 155 | 155 |
| | Dry Amount of Surface Modifier (g/m²) | 0.15 | — | 0.15 | 0.15 | 0.05 | 0.4 | 0.15 | 0.15 | — |
| Film Evaluation | Porosity (%) | 33 | 33 | 33 | 33 | 33 | 33 | 33 | 33 | 33 |
| Melt Thermal Transfer Printability | Ink Transferability | 5 | 1 | — | 3 | 5 | 5 | 5 | 5 | — |
| | Ink Adhesiveness | 5 | 1 | — | 3 | 5 | 5 | 5 | 5 | — |
| Offset Printability | Ink Transferability | 1.4 | 0.5 | — | 1.4 | 1.4 | 1.3 | 1.4 | 1.4 | — |
| | Ink Adhesiveness (kgcm) | 1.3 | 0.3 | — | 0.8 | 1.4 | 1.4 | 1.3 | 1.3 | — |
| | Water Resistance | 5 | 1 | — | 3 | 5 | 5 | 5 | 5 | — |

TABLE 3

| Item | | Example 6 | Example 7 | Example 8 | Example 9 | Comparative Example 5 | Comparative Example 6 |
|---|---|---|---|---|---|---|---|
| | Abbreviation of Thermoplastic Resin Sheet | P1 | P1 | P1 | P2 | P1 | P1 |
| Surface Treatment | Type of Surface Treatment | flame treatment | flame treatment | flame treatment | corona discharge | corona discharge | corona discharge |
| | Degree of Treatment (corona treatment, W min/m², flame treatment, J/m²) | 37700 | 28000 | 80600 | 100 | 100 | 100 |
| | Abbreviation of Surface Modifier | A1 | A1 | A1 | A1 | A1 | A1 |
| | Timing of Coating | before stretching | before stretching | before stretching | before stretching | after stretching | after stretching |
| | Drying Temperature (° C.) | 155 | 155 | 155 | 155 | 60 | 155 |
| | Dry Amount of Surface Modifier (g/m²) | 0.15 | 0.15 | 0.15 | 0.15 | 0.15 | — |
| Film Evaluation | Porosity (%) | 33 | 33 | 33 | 29 | 33 | — |
| Melt Thermal Transfer Printability | Ink Transferability | 5 | 5 | 5 | 5 | 5 | — |
| | Ink Adhesiveness | 5 | 5 | 5 | 5 | 5 | — |
| Offset Printability | Ink Transferability | 1.4 | 1.4 | 1.4 | 1.4 | 1.4 | — |
| | Ink Adhesiveness (kgcm) | 1.3 | 1.3 | 1.3 | 1.4 | 1.4 | — |
| | Water Resistance | 5 | 5 | 5 | 5 | 3 | — |

Industrial Applicability

The invention provides a thermoplastic resin film which, when used in melt thermal transfer printing, has good ink transferability, adhesiveness and good water-resistant adhesiveness at high temperature and high humidity, and which, when used in offset printing, has good ink transferability, adhesiveness and water resistance.

As described above, if the production method of the present invention is used, a light-transmitting electromagnetic wave-shielding film that simultaneously satisfies high transmittance and high conductivity (electromagnetic wave-shielding ability) and is free from the problem of moire can be obtained. Further, if the production method of the present invention is used, a production method of further higher productivity can be utilized, and as a result, light-transmitting electromagnetic wave-shielding films can be produced in a large amount at a low cost.

The present disclosure relates to the subject matter contained in Japanese Patent Application No. 187745/2001 filed on Jun. 21, 2001, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method of surface treatment of a thermoplastic resin film (i) which comprises the steps of subjecting the thermoplastic resin film (i) to surface oxidation, coating the oxidized film with a surface modifier (A) and then stretching the coated film, and which is characterized in that:

the surface modifier (A) is an aqueous dispersion prepared by dispersing an olefin copolymer (a) with an unsaturated carboxylic acid or its anhydride bonded thereto in water along with at least one dispersant (b) selected from the group consisting of nonionic surfactants, nonionic water-soluble polymers, cationic surfactants and cationic water-soluble polymers, a ratio by weight of (a)/(b) in terms of a solid content thereof falls between 100/1 and 100/30, and a mean particle size of the olefin copolymer (a) with the unsaturated carboxylic acid or its anhydride bonded thereto in the surface modifier (A) is at most 5 $\mu$m.

2. The method of surface treatment as claimed in claim 1, wherein the thermoplastic resin film (i) is a multi-layered resin film prepared by longitudinally stretching a substrate layer (ii) of thermoplastic resin followed by laminating a surface layer (iii) of thermoplastic resin on at least one face of the substrate layer (ii), and the thermoplastic resin film (i) is, after having been subjected to surface oxidation, coated with a surface modifier (A) and then laterally stretched.

3. The method of surface treatment as claimed in claim 1, wherein the thermoplastic resin film (i) is a multi-layered resin film prepared by laminating a surface layer (iii) of thermoplastic resin on at least one face of a substrate layer (ii) of thermoplastic resin, and the thermoplastic resin film (i) is, after having been subjected to surface oxidation, coated with a surface modifier (A) and then longitudinally stretched.

4. The method of surface treatment as claimed in claim 2, wherein the thermoplastic resin film (i) is a multi-layered resin film that comprises a substrate layer (ii) containing from 40 to 100% by weight of a thermoplastic resin and from 0 to 60% by weight of an inorganic fine powder and/or an organic filler, and a surface layer (iii) containing from 25 to 100% by weight of a thermoplastic resin and from 0 to 75% by weight of an inorganic fine powder and/or an organic filler.

5. The method of surface treatment as claimed in claim 1, wherein the porosity, as represented by the following formula, of the thermoplastic resin film (i) is from 10 to 60% after having been subjected to the surface treatment:

$$\text{Porosity } (\%) = [(\rho_0 - \rho)/\rho_0] \times 100 \quad (1)$$

wherein $\rho_0$ indicates the density of the resin film before the stretching, and $\rho$ indicates the density of the resin film after the stretching.

6. The method of surface treatment as claimed in claim 1, wherein the thermoplastic resin film (i) contains an polyolefin-based resin.

7. The method of surface treatment as claimed in claim 6, wherein the polyolefin-based resin is a propylene-based resin.

8. The method of surface treatment as claimed in claim 1, wherein the oxidation is at least one treatment selected from corona discharge treatment, flame treatment, plasma treatment, glow discharge treatment and ozone treatment.

9. The method of surface treatment as claimed in claim 8, wherein the oxidation is corona treatment effected at 10 to 200 W·min/m$^2$, or flame treatment effected at 8,000 to 200,000 J/m$^2$.

10. The method of surface treatment as claimed in claim 1, wherein the dispersant (b) is a cationic water-soluble polymer.

11. The method of surface treatment as claimed in claim 1, wherein the dispersant (b) is a (meth)acrylic polymer containing a nitrogen atom constituting a quaternary ammonium salt.

12. The method of surface treatment as claimed in claim 1, wherein the coating amount of the surface modifier (A) is at least 0.005 g/m$^2$ in terms of the dry weight thereof.

13. The method of surface treatment as claimed in claim 1, wherein the coating amount of the surface modifier (A) is from 0.01 to 0.6 g/m$^2$ in terms of the dry weight thereof.

14. The method of surface treatment as claimed in claim 1, wherein the olefin copolymer (a) is an ethylene-(meth)acrylic acid copolymer, an alkaline (earth) metal salt of an ethylene-(meth)acrylic acid copolymer, an ethylene-(meth)acrylate-maleic anhydride copolymer, a (meth)acrylic acid-grafted polyethylene, a maleic anhydride-grafted polyethylene, a maleic anhydride-grafted ethylene-vinyl acetate copolymer, a maleic anhydride-grafted (meth)acrylate-ethylene copolymer, a maleic anhydride-grafted polypropylene, a maleic anhydride-grafted ethylene-propylene copolymer, a maleic anhydride-grafted ethylene-propylene-butene copolymer, a maleic anhydride-grafted ethylene-butene copolymer, or a maleic anhydride-grafted propylene-butene copolymer.

15. The method of surface treatment as claimed in claim 1, wherein the olefin copolymer (a) is an ethylene-(meth)acrylic acid copolymer, an ethylene-(meth)acrylate-maleic anhydride copolymer, a maleic anhydride-grafted ethylene-vinyl acetate copolymer, a maleic anhydride-grafted (meth)acrylate-ethylene copolymer, a maleic anhydride-grafted ethylene-propylene-butene copolymer, a maleic anhydride-grafted ethylene-butene copolymer or a maleic anhydride-grafted propylene-butene copolymer of which the melting point or the softening point is not higher than 130° C.

16. The method of surface treatment as claimed in claim 1, wherein the content of the unsaturated carboxylic acid or its anhydride in the olefin copolymer (a) is from 2 to 40% by weight.

* * * * *